Feb. 27, 1934.  W. L. LINDGREN  1,948,861
FERTILIZER AND LIKE SPREADER
Filed Oct. 21, 1932  2 Sheets-Sheet 1
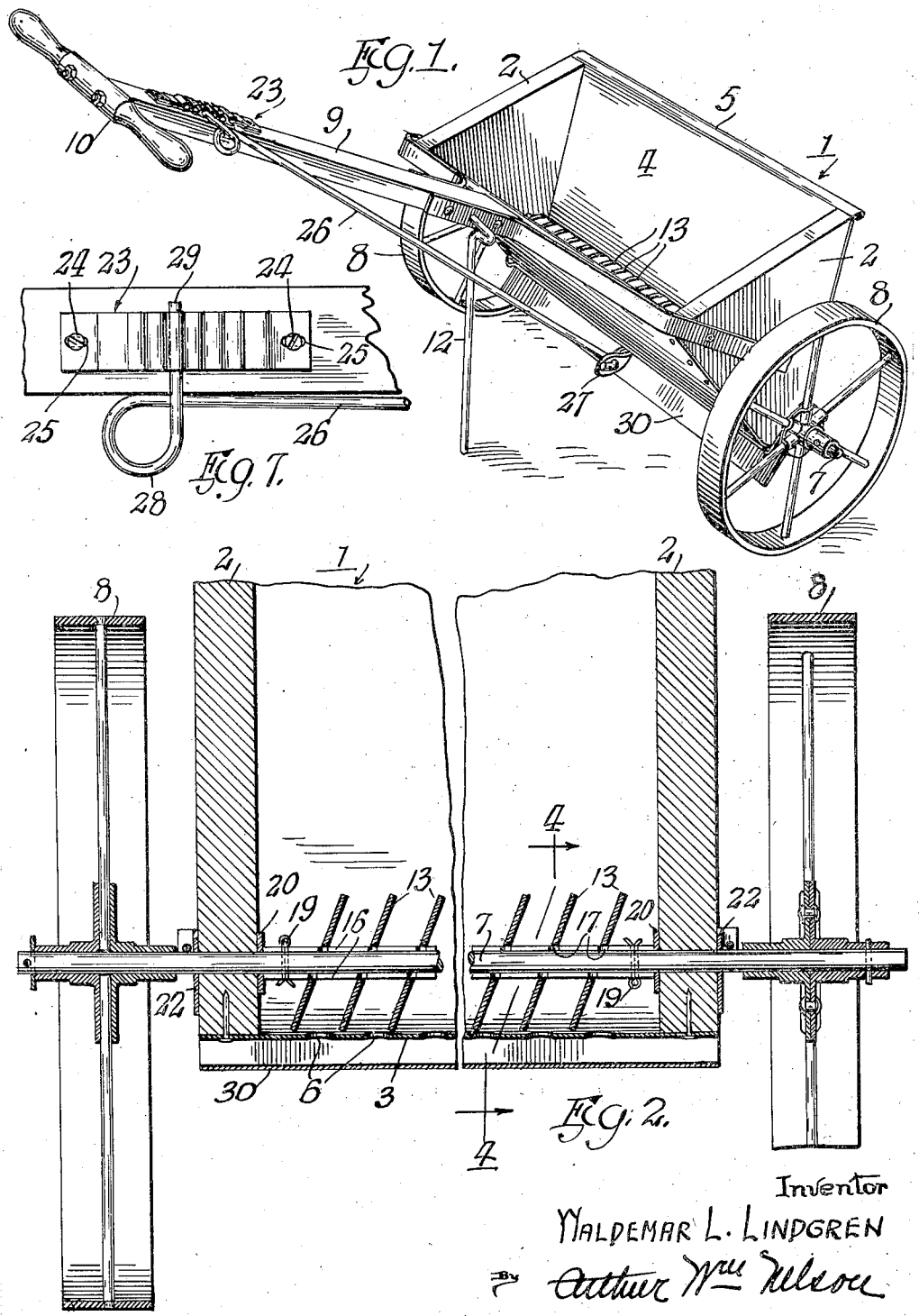
Inventor
WALDEMAR L. LINDGREN Feb. 27, 1934.  W. L. LINDGREN  1,948,861
FERTILIZER AND LIKE SPREADER
Filed Oct. 21, 1932  2 Sheets-Sheet 2
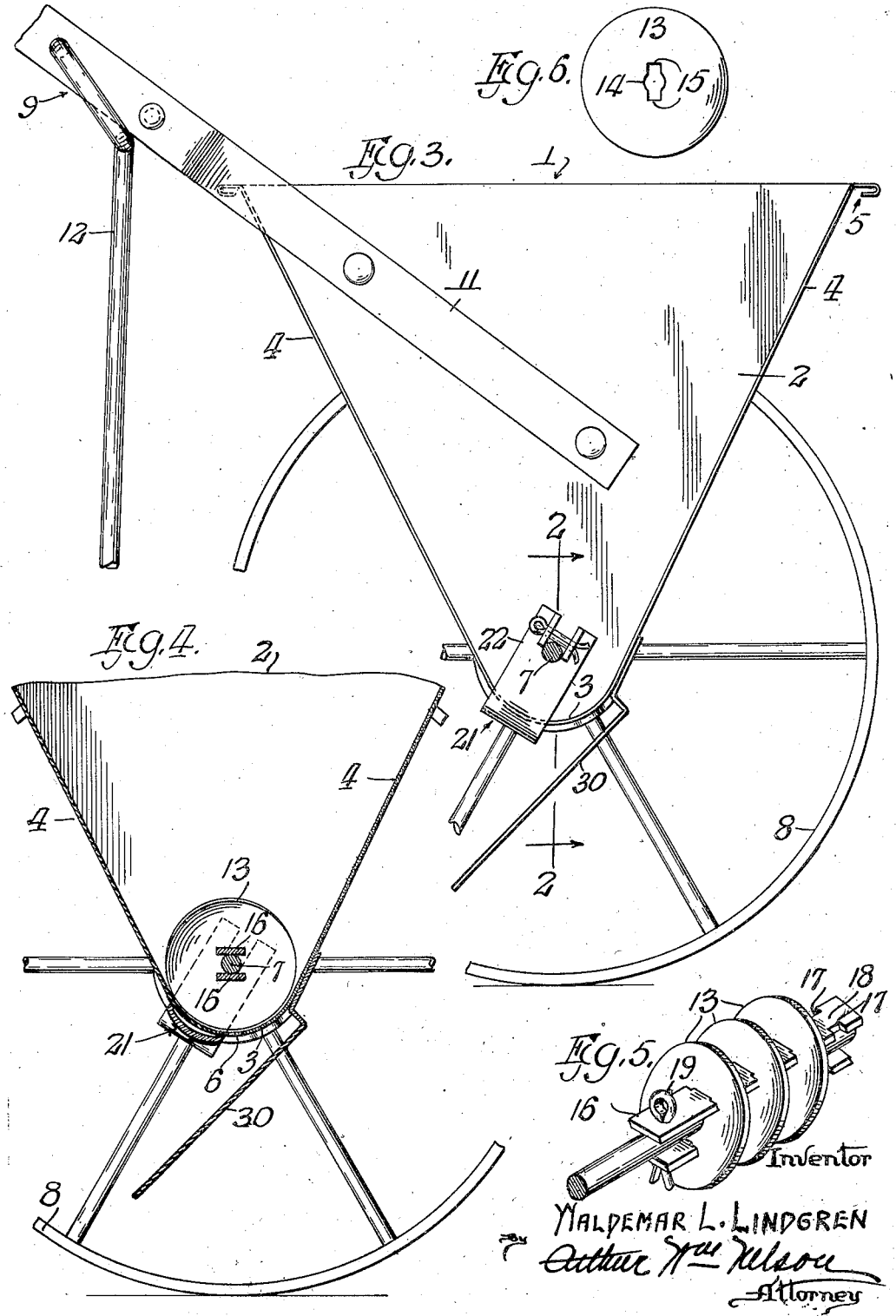

Patented Feb. 27, 1934

1,948,861

UNITED STATES PATENT OFFICE 1,948,861

FERTILIZER AND LIKE SPREADER

Waldemar L. Lindgren, Waukegan, Ill., assignor to Hoeft & Company, Inc., North Chicago, Ill., a corporation of Illinois Application October 21, 1932. Serial No. 638,841

8 Claims. (Cl. 221—118)

This invention relates to improvements in fertilizer and like spreaders and it consists of the matters hereinafter described and more particularly pointed out in the appended claims.

The primary object of the invention is to provide a simple and efficient mobile device for uniformly spreading any dry pulverized commercial fertilizer, pulverized lime, ashes, bone meal or grass seed over a lawn or the like, and which device is simple in its construction and is positive in its operation and this without any tendency to cause packing of the material being spread, while in the hopper.

Another object of the invention is to provide a novel distributing or agitating means for the spreader which includes a plurality of discs arranged in spaced relation on a driving shaft within the associated hopper and which discs are disposed at an angle other than a right angle on said shaft and operate to sweep in one direction and then the other with a reversing helical action over associated feed openings in the hopper bottom to insure an even distribution and a steady continuous flow of the material operated upon, out through said feed openings.

Another object of the invention is to provide means for adjusting the size or area of the feed openings and which means is easily actuated from the draft tongue by which movement is imparted to the spreader, so that it may be adjusted for use with either relatively coarse or fine material or the feed may be closed off entirely when moving the spreader over side walks or the like.

The above mentioned objects of the invention, as well as others, together with the many advantages thereof, will more fully appear as I proceed with my specification.

In the drawings:

Fig. 1 is a perspective view of a spreader of the kind mentioned, embodying my invention.

Fig. 2 is a longitudinal vertical sectional view through the same on an enlarged scale as taken on the line 2—2 of Fig. 3.

Fig. 3 is a view in end elevation of the hopper and associated parts thereon.

Fig. 4 is a transverse vertical sectional view through the bottom of the hopper as taken on the line 4—4 of Fig. 2.

Fig. 5 is a detail perspective view of a part of the distributing mechanism and which will be more fully referred to later.

Fig. 6 is a view in elevation of one of the discs embodied in the distributing mechanism of the spreader.

Fig. 7 is a view in plan elevation of means on the draft tongue whereby a certain gate may be actuated to control the area of the feed openings in the bottom of the hopper.

In general, my improved spreader includes a hopper having a rounded bottom wall, upright end walls and front and rear walls that diverge upwardly and outwardly from the rounded bottom wall. A shaft is journalled in the end walls of the hopper, on an axis substantially coincident with that of the rounded bottom wall. In said bottom wall are longitudinally spaced feed openings.

On each end of the shaft, outside the end walls is a carrying wheel by which the spreader is made easily movable and at least one wheel is fixed to said shaft so as to drive the same when the device is moved along by means of a suitable draft tongue. On said shaft, within the bottom of the hopper, is provided a plurality of discs arranged at an angle other than a right angle to said shaft and said discs are spaced in accordance with the spacing of the feed openings in the bottom of the hopper. When the shaft is rotated, the peripheral edges of said discs act to sweep back and forth across the associated feed openings to move the material in said hopper out through said feed openings.

A gate is mounted on the outer surface of the rounded bottom of the hopper and this gate is pivoted at its ends on the shaft outside the ends of the hopper. This gate may be swung about the shaft as an axis to decrease or increase the size of said openings from a minimum to a maximum area.

Said gate is actuated by means of a rod which is pivotally connected to the gate at about its middle and its other end is bent to form a loop and lateral extension. This extension may be engaged within any desired one of a number of recesses or holes provided therefor by a pair of plates on the top side of the draft tongue and thus hold the gate in the desired position.

When the spreader is pushed or pulled, the agitator shaft is wheel driven and the discs thereon turn with the shaft. Due to the angular arrangement of the discs on the shaft, the periphery of each disc will sweep back and forth across its associated discharge opening with a reversible helical action, the several discs operating in conjunction to move the material out through the discharge openings. The material discharged from said opening falls upon a scatter plate which spreads it evenly in its discharge upon the lawn surface or the like being treated.

Referring now in detail to that embodiment of the invention, illustrated in the drawings:

1 indicates as a whole the open top hopper of the spreader which includes laterally spaced substantially V-shaped end walls 2 preferably made of wood, a round bottom wall 3, and front and rear end walls 4—4 which are directed upwardly and outwardly from the bottom wall. The said bottom, front and rear walls are made from a piece of sheet metal secured at its ends to the end walls and preferably the top margins of said front and rear walls are flanged over as at 5 for stiffness.

On the median line of the bottom wall is a plurality of longitudinally spaced discharge openings 6 and extending through said hopper from end to end, in the plane of the axis of the curved or rounded bottom wall is a shaft 7. Said shaft is journalled in said end walls and on said shaft outwardly beyond end walls are mounted supporting wheels 8 at least one of which is fixed to its associated shaft end. To impart movement to the spreader, a tongue 9 is provided and said tongue carries a cross handle 10 at one end and is fixed at its other end to straps 11 which in turn are suitably bent to engage with and be fixed to the outer surface of the end walls 2—2. Near said straps, said tongue has pivoted thereto, a depending leg 12 which provides a tongue support for the spreader when the same is not in actual use, as when filling the hopper.

On that part of the shaft 7, within the hopper, is a plurality of discs 13 spaced in accordance with the spacing of the discharge openings 6, there being one disc, associated with each opening. All of said discs stand at the same angle with respect to the shaft, which angle is other than a right angle to said shaft.

To provide a shaft and disc arrangement which is economical to make and easy to assemble, I provide the following:

Each disc is circular in form and has a radius slightly less than that of the inner surface of the curved or rounded bottom of the hopper so as to have a slight clearance with respect thereto. Each disc has a central hole 14 of a diameter slightly greater than that of the shaft 7 and opening into said hole from opposite sides are recesses 15—15.

On opposite sides of the shaft are disc locking bars 16, of a width approximating the diameter of the shaft 7 and in opposite margins of each bar are notches 17—17 with portions 18 between the notches in opposite margins. Each bar is of a length approximating the distance between the end walls of the hopper and has the notches arranged in the same manner with one endmost pair of notches arranged closer to its associated bar extremity than is the other endmost pair of notches with respect to its associated bar extremity. In assembling the discs and bars, the bars are reversed end for end, and then slipped through the center holes of all of the discs and the portions 18 of said bars between the pairs of notches are engaged in the recesses 15 that open into the center hole 14 of the discs.

The thus far assembled bars and discs are then arranged in the hopper and the shaft 7 is then inserted through one end wall of hopper and then through the discs between the bars and out through the other end wall of the hopper. By reason of the end for end reversal of the bars mentioned, it is apparent that the notches 17 in one bar are offset longitudinally with respect to those in the other bar and this offset determines the angular arrangement of the discs. Cotter pins 19 are inserted through suitable holes in the bars and shaft to lock them together. In the assembly of the parts just mentioned, washers 20 are interposed between the ends of the bars and the end walls of the hopper to take up the end thrust action of said bars.

Associated with the outside of the rounded bottom of the hopper and transversely curved in accordance therewith is a gate or cutoff member 21 having end ears 22 arranged for a pivotal supporting engagement upon the shaft 7 adjacent the outer surface of the end walls 2—2 as best shown in Fig. 3.

On the top side of the tongue 9 between the handle 10 and supporting leg 12 is provided a pair of plates 23 (see Fig. 7) formed to provide transverse openings therebetween. This plate is secured in place by means of screws 24 which pass through longitudinal slots 25 in the ends of said plates into the tongue. A rod 26 is operatively connected at one end to an ear 27 on the gate and the other end of said rod is bent to form a loop 28 which terminates in a lateral extension 29. This extension is adapted for engagement in the desired opening in said pair of plates 23 on the tongue.

By moving said rod forwardly or rearwardly of the tongue, the gate is swung about its pivotal connection with the shaft to expose more or less of each of the openings 6 in the bottom part of the hopper and thus determines the effective discharge area therefor. The rod 26 may be locked in the adjusted position by the engagement of its lateral extension in the desired opening in the pairs of plates 23. The screw and slot connection before described provides an adjustment for said plates on the tongue. Suitably supported from the hopper, below the gate 21 is a plate 30 upon which the material discharged through the openings, falls to be scattered and spread evenly thereby. This plate is made to extend close to the ground to prevent wind interference.

With a supply of material in the hopper, and with the gate 21 adjusted to provide that area for the desired discharge through the openings, when the spreader as a whole is pushed or pulled along the desired path, the shaft 7 will be rotated.

In the rotation of the shaft, the peripheral edges of the discs 13, because of their angular position on the shaft, will sweep back and forth across the openings 6 with a reversible helical action and will feed such material out through the said openings.

By this arrangement, there is no action tending to crowd the material toward one end of the hopper so that the material does not become packed in the hopper, but is fed for an even spreading upon the scatter plate.

By means of the gate, the spreader may be adjusted for the spreading of relatively coarse and fine materials, and when the gate is moved to entirely close off said openings, the loaded spreader may be moved from one place to the other without a discharge of the material, from the hopper.

While in describing the invention, I have referred in detail to the form, arrangement and construction of the various parts, the same is to be considered merely as illustrative so that I do not wish to be limited thereto except as may be specifically set forth in the appended claims.

I claim as my invention:

1. A spreader embodying therein a hopper having discharge openings therein, a rotatable shaft in said hopper and a plurality of discs longitudinally spaced on said shaft and arranged at an angle other than a right angle thereto and having peripheral portions formed to sweep back and forth across said openings in the rotation of said shaft, and bars fixed to and extending longitudinally of the shaft and through central portions of the discs to hold them in the angular position on the shaft and to provide the driving connection between the shaft and discs.

2. A spreader embodying therein a hopper having discharge openings therein, a rotatable shaft in said hopper and a plurality of discs longitudinally spaced on said shaft and arranged at an angle other than a right angle thereto and having peripheral portions formed to sweep back and forth across said openings with a reversible helical action in the rotation of said shaft and means on opposite sides of the shaft and engaging all of said discs for holding them in the angular position on the shaft and for providing the driving connection between the shaft and discs.

3. A spreader embodying therein a hopper having a rounded bottom with longitudinally spaced openings therein, a rotatable shaft in said hopper, a plurality of discs longitudinally spaced on said shaft, there being one of such discs associated with each opening, said discs being arranged at an angle other than a right angle to said shaft and each having peripheral portions formed to sweep back and forth across an associated opening in the rotation of the shaft and means extending longitudinally of the shaft and having a recess connection with the discs to hold them in said angular position to provide the driving connection between said shaft and discs.

4. In combination with a hopper, a shaft rotative therein and a plurality of discs fixed in longitudinally spaced relation on said shaft and arranged at an angle other than a right angle with respect to said shaft and means fixed at their ends to opposite sides of the shaft and extending through notches in said discs to fix them in operative relation on the shaft and provide the driving connection between the shaft and discs.

5. In combination with a hopper, a shaft rotative therein, a plurality of discs longitudinally spaced on said shaft and having notches adjacent the shaft and means fixed to said shaft and extending through the notches of all of said discs and holding them in a position other than a right angle to the plane of said shaft.

6. In combination with a hopper, a shaft rotative therein, a plurality of discs longitudinally spaced on said shaft and means on opposite sides of the shaft and fixed thereto and engaged with portions of said discs to hold them in a position other than a right angle to the plane of said shaft.

7. In combination with a hopper, a shaft rotative therein, a plurality of discs longitudinally spaced on said shaft and having recesses adjacent said shaft and means fixed to said shaft and engaged in the recesses in said discs for holding them in a position other than a right angle to said shaft.

8. In combination with a hopper, a shaft rotative therein, a plurality of discs longitudinally spaced on said shaft and having recesses adjacent said shaft and bars fixed to said shaft and having recesses in opposite edges with portions between said recesses engaged in the recesses in said discs for holding said discs in a position other than a right angle to the plane of said shaft.

WALDEMAR L. LINDGREN.